United States Patent [19]

Koya

[11] Patent Number: 4,817,033
[45] Date of Patent: Mar. 28, 1989

[54] SIGNAL DETECTING CIRCUIT

[75] Inventor: Kei Koya, Tokyo, Japan

[73] Assignee: NEC Corporation, Tokyo, Japan

[21] Appl. No.: 931,830

[22] Filed: Nov. 18, 1986

[30] Foreign Application Priority Data

Nov. 20, 1985 [JP] Japan ................. 60-260618

[51] Int. Cl.⁴ .............................. G06F 11/00
[52] U.S. Cl. .................... 364/900; 307/231
[58] Field of Search ... 364/200 MS File, 900 MS File; 307/231, 236, 362; 328/132, 150

[56] References Cited

U.S. PATENT DOCUMENTS

4,039,858  8/1977  Stewart ....................... 307/231
4,306,194 12/1981  Chapman ................. 307/236 X Primary Examiner—Thomas M. Heckler
Attorney, Agent, or Firm—Sughrue, Mion, Zinn, MacPeak & Seas

[57] ABSTRACT

A signal detecting circuit for detecting signals from a signal output circuit having a predetermined number of output terminals of which only one output terminal is to be normally selected during each recurrent cycle of operation, comprising the combination of a first circuit unit which has input terminals respectively connected to the output terminals of the signal output circuit and which has a first operative condition established with only one of the input terminals activated and a second operative condition established with at least two of the input terminals activated, the first circuit unit being operative to produce an output signal which has one voltage level under the first operative condition and another voltage level under the second operative condition, and a second circuit unit which is connected to the first circuit unit and which is operative to discriminate one of the first and second operative conditions from the other on the basis of the output signal from the first circuit unit.

14 Claims, 4 Drawing Sheets

SIGNAL DETECTING CIRCUIT

FIELD OF THE INVENTION

The present invention relates to a device for detecting signals from a signal output circuit having a plurality of parallel outputs and, more particularly, to a signal detecting circuit to be fabricated on a semiconductor chip formed with an integrated circuitry including a signal output circuit having a plurality of parallel outputs such as typically an address decoder, a shift register or a binary counter.

BACKGROUND OF THE INVENTION

Some semiconductor integrated circuitries have incorporated therein some types of signal detecting circuits. Typical of such signal detecting circuits are testing circuits for testing address decoders provided within the memory systems on integrated circuit chips on the basis of built-in self-diagnosis programs incorporated in the integrated circuit chips.

One of the most important problems of known address decoder testing circuits for memory systems fabricated on semiconductor integrated circuit chips is the requirement for vast numbers of semiconductor devices to implement the testing circuits. The use of such an extremely large number of semiconductor devices on a single chip will result in a large share of the area which the decoder testing circuit occupies on the chip and further in a large number of opportunities of failure taking place in the testing area of the chip. The present invention contemplates provision of an improved address decoder testing circuit which will eliminate or broadly alleviate these problems.

DESCRIPTION OF THE PRIOR ART

Figure 1:
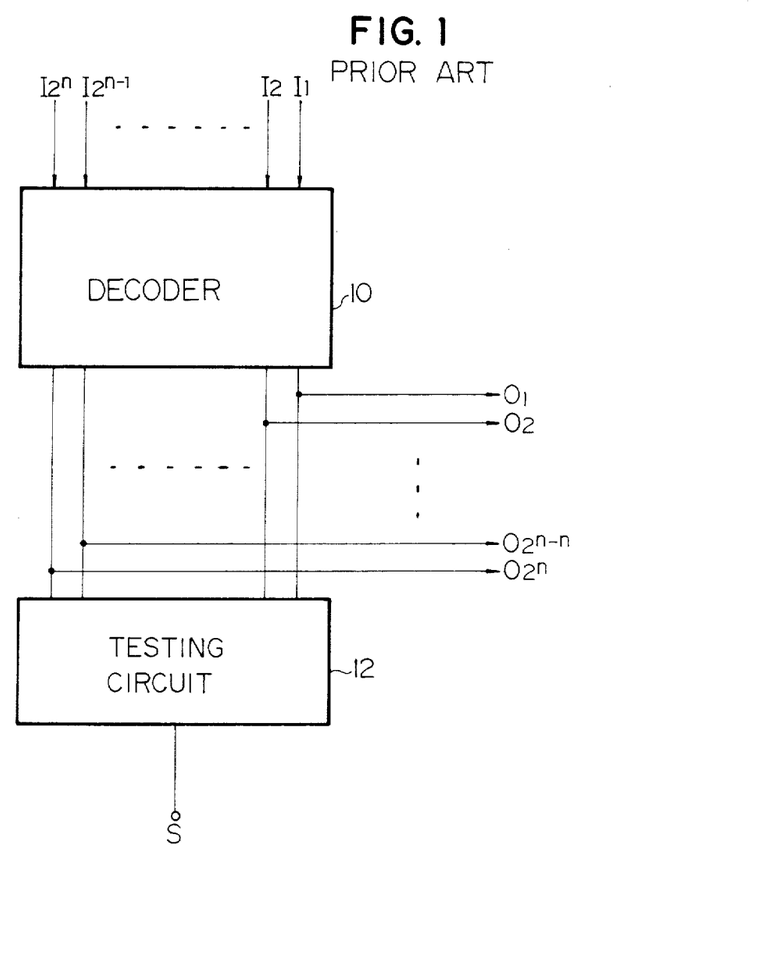
FIG. 1 is a schematic block diagram showing the general arrangement incorporating an address decoder circuit and a known decoder testing circuit.

FIG. 1 of the drawings shows the general circuit topology incorporating an address decoder circuit 10 and a testing circuit 12 for testing the decoder circuit 10. As well known in the art, an address decoder circuit used in a semiconductor memory system is operative to select the cells to be read from and/or written into the memory system (not shown). Such an address decoder circuit has the characteristic that, for each of the possible $2^n$ number of binary input numbers which can be taken by an n number of memory cells, the decoder matrix will have a unique one of its $2^n$ number of output lines selected. The circuit arrangement to achieve such characteristics is well known in the art and, for this reason, description regarding the detailed construction of the address decoder circuit 10 will not be herein incorporated. Suffice here it to say that the decoder circuit 10 shown in FIG. 1 has an n number of input lines $I_1, I_2, \ldots I_{n-1}$ and $I_n$ and accordingly a $2^n$ number of output lines $O_1, O_2, \ldots O_{2n-1}$ and $O_{2n}$ as shown. These $2^n$ number of output lines $O_1, O_2, \ldots O_{2n-1}$ and $O_{2n}$ are connected to the individual memory cells of a memory array (not shown) through the bit lines and word lines of the array, though not shown in the drawings.

In the arrangement shown in FIG. 1, the $2^n$ number of output lines $O_1, O_2, \ldots O_{2n-1}$ and $O_{2n}$ are further connected to the address decoder testing circuit 12 which per se is also known. In response to the binary address signals supplied in succession through the lines $O_1, O_2, \ldots O_{2n-1}$ and $O_{2n}$, the address decoder testing circuit 12 produces a logic "1" or "0" test result signal S at its output terminal depending upon the proper or improper operating condition of the address decoder circuit 10. Thus, a logic "1" test result signal S appears at the output terminal of the decoder testing circuit 12 to indicate that the decoder circuit 10 under testing is in a sound state selecting only one of the $2^n$ number of output lines $O_1, O_2, \ldots O_{2n-1}$ and $O_{2n}$. On the other hand, a logic "0" test result signal S appearing at the output terminal of the address decoder testing circuit 12 indicates that the decoder circuit 10 is in an improper state selecting two or more of the output lines $O_1, O_2, \ldots O_{2n-1}$ and $O_{2n}$ concurrently. Whether the address decoder circuit 10 is operating properly or not is thus known from the logic state of the signal S to be output from the decoder testing circuit 12 during each read or write cycle of the system under testing or inspection.

Figure 2:
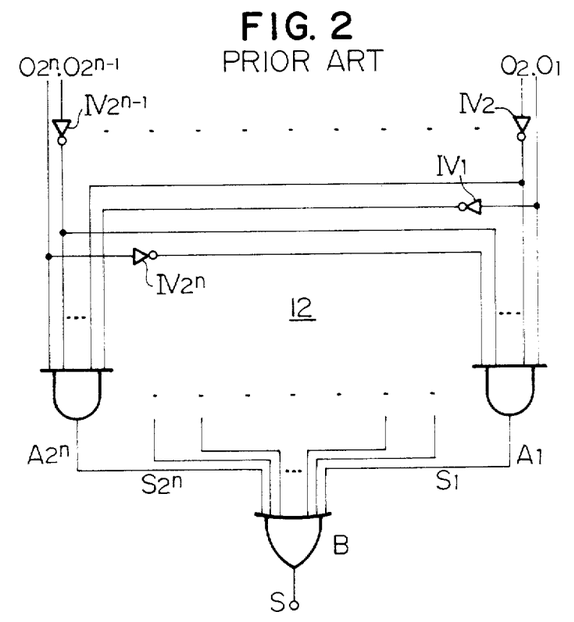
FIG. 2 is a circuit diagram showing the circuit arrangement of a representative example of the prior-art address decoder testing circuit included in the arrangement illustrated in FIG. 1.

FIG. 2 of the drawings shows the circuit arrangement of a representative example of the decoder testing circuit 12 to produce the test result signals S in response to the decoded binary address signals supplied from the address decoder circuit 10. As shown in FIG. 2, the decoder testing circuit 12 includes a $2^n$ number of logic AND gates $A_1, A_2, \ldots A_{2n-1}$ and $A_{2n}$ each having a $2^n$ number of input terminals. The first AND gate $A_1$ has one of its input terminals connected directly to the output line $O_1$ from the address decoder circuit 10 and the remaining input terminals connected through inverters $IV_2, IV_3, \ldots IV_{2n-1}$ and $IV_{2n}$ to the output lines $O_2, O_3, \ldots O_{2n-1}$ and $O_{2n}$, respectively, from the decoder circuit 10. Thus, the logic output signal, $S_1$, from the $A_1$ is expressed in the form $O_1.\overline{O}_2.\ldots\overline{O}_{2n-1}.\overline{O}_{2n}$. In a like manner, the second AND gate $A_2$ has one of its input terminals connected directly to the output line $O_2$ from the address decoder circuit 10 and the remaining input terminals connected through an inverter $IV_1$ and the inverters $IV_3, \ldots IV_{2n-1}$ and $IV_{2n}$ to the output lines $O_1, O_3, \ldots O_{2n-1}$ and $O_{2n}$, respectively, from the decoder circuit 10. The logic output signal $S_2$ from the AND gate $A_2$ is thus expressed in the form $\overline{O}_1.O_2.\ldots\overline{O}_{2n-1}.\overline{O}_{2n}$. The AND gate $A_{2n-1}$ has one of its input terminals connected directly to the output line $O_{2n-1}$ from the address decoder circuit 10 and the remaining input terminals connected through the inverters $IV_1, IV_2, \ldots IV_{2n-2}$ and the inverter $IV_{2n}$ to the output lines $O_1, O_2, \ldots O_{2n-2}$ and $O_{2n}$, respectively, from the decoder circuit 10. The logic output signal $S_{2n-1}$ from the AND gate $A_{2n-1}$ is thus expressed in the form $\overline{O}_1.\overline{O}_2.\ldots O_{2n-1}.\overline{O}_{2n}$. The AND gate $A_{2n}$ has one of its input terminals connected directly to the output line $O_{2n}$ from the address decoder circuit 10 and the remaining input terminals connected through the inverters $IV_1, IV_2, \ldots$ and $IV_{2n-1}$ to the output lines $O_1, O_2, \ldots$ and $O_{2n-2}$, respectively, from the decoder circuit 10. The logic output signal $S_{2n}$ from the AND gate $A_{2n}$ is thus expressed in the form $\overline{O}_1.\overline{O}_2.\ldots\overline{O}_{2n-1}.O_{2n}$. To summarize, a given AND gate has one of its input terminals connected directly to the output line exclusively associated with the particular AND gate and the remaining input terminals connected through inverters to those output lines from the address decoder circuit 10 which exclude the exclusively associated output lines from the decoder circuit 10.

The logic output signals $S_1, S_2, \ldots S_{2n-1}$ and $S_{2n}$ thus produced by the AND gates $A_1, A_2, \ldots A_{2n-1}$ and $A_{2n}$, respectively are supplied to a common logic OR gate B. The OR gate then produces as the above mentioned test result signal S a logic output signal which is Boolean algebraically expressed as $$\begin{aligned}
S &= S_1 + S_2 + \ldots + S_{2^n-1} + S_{2^n} \\
&= (O_1.\bar{O}_2.\ldots \bar{O}_{2^n-1}.\bar{O}_{2^n}) + \\
&\quad (\bar{O}_1.O_2.\ldots \bar{O}_{2^n-1}.\bar{O}_{2^n}) + \ldots + \\
&\quad (\bar{O}_1.\bar{O}_2.\ldots O_{2^n-1}.\bar{O}_{2^n}) + (\bar{O}_1.\bar{O}_2.\ldots \bar{O}_{2^n-1}.O_{2^n}).
\end{aligned}$$

From this equation it will be seen that (1) if the address signal appearing on any one, and only one, of the output lines $O_1, O_2, \ldots O_{2^n-1}$ and $O_{2^n}$ of the address decoder circuit 10 is of logic "1" state and each of the address signals on all the other output lines is of a logic "0" state, then only one of the AND gates $A_1, A_2, \ldots A_{2^n-1}$ and $A_{2^n}$ is enabled to produce a logic "1" output signal so that the OR gate B is conditioned to produce a logic "1" output signal as the test result signal S; and (2) if the address signals appearing on any two or more of the output lines $O_1, O_2, \ldots O_{2^n-1}$ and $O_{2^n}$ of the address decoder circuit 10 are concurrently of logic "1" states and each of the signals on all the other output lines is of a logic "0" state, then all of the AND gates $A_1, A_2, \ldots A_{2^n-1}$ and $A_{2^n}$ produce logic "1" output signals so that the OR gate B is conditioned to produce a logic "0" output signal as the test result signal S.

The decoder testing circuit 12 of the nature hereinbefore described however has a critical drawback in that the circuit requires a vast number of active semiconductor devices. Assuming by way of example that the address decoder circuit 10 has a $2^n$ number of outputs as above discussed and the decoder circuit 10 is realized in a CMOS (complementary metal-oxide-semiconductor) configuration as is customary in the art, then the decoder testing circuit 12 must be composed of a $2^n \times 2$ number of transistors for the inverters $IV_1, IV_2, \ldots IV_{2^n-1}$ and $IV_{2^n}$, a $2^n \times 2^n \times 2$ number of transistors for the AND gates $A_1, A_2, \ldots A_{2^n-1}$ and $A_{2^n}$ and, a $2^n \times 2$ number of transistors for the OR gate B. A total of a $2^{n+2}(1+2^{n-1})$ number of transistors are thus required for the decoder testing circuit 12 as a whole. The use of such an extremely large number of semiconductor devices on a single chip will result in a disproportionate large share of the area which the decoder testing circuit occupies on the chip and further in a correspondingly large number of opportunities of failure taking place in the testing area of the chip.

The present invention contemplates to eliminate these problems which have thus far been inherent in a prior-art decoder testing circuit of the described nature. It is, accordingly, a prime object of the present invention to provide an improved signal detecting circuit such as typically an address decoder testing circuit which can be fabricated using a significantly reduced number of semiconductor devices.

SUMMARY OF THE INVENTION

In accordance with one important aspect of the present invention, there is provided a signal detecting circuit for detecting signals from a signal output circuit having a predetermined number of output terminals of which one, and only one, output terminal is to be normally selected during each of recurrent cycle of operation, comprising the combination of (a) a first circuit unit which has input terminals respectively associated with the output terminals of the signal output circuit and which has a first operative condition established with only one of the input terminals activated and a second operative condition established with at least two of the input terminals activated, the first circuit unit being operative to produce an output signal which has one voltage level under the first operative condition and another voltage level under the second operative condition, and (b) a second circuit unit which is connected to the first circuit unit and which is operative to discriminate one of the first and second operative conditions to the other on the basis of the output signal from the first circuit unit. In a preferred embodiment of a signal detecting circuit according to the present invention, the first circuit unit comprises a parallel combination of a plurality of transistors each having a control electrode connected to each of the input terminals of the first circuit unit and a control transistor connected between a voltage supply line and the parallel combination of the plurality of transistors.

The signal detecting circuit thus constructed in accordance with the present invention may further comprise logic circuit means connected to the control electrode of the the control transistor, the logic circuit means being responsive to a test enable signal which enables the signal detecting circuit to test the signal output circuit and a circuit activating signal enabling the first circuit unit to be responsive to signals to appear on the output terminals of the first circuit unit for activating the control transistor in the presence of at least one of the test enable signal and the circuit activating signal.

In accordance with another important aspect of the present invention, there is provided a signal detecting circuit for detecting signals output from a signal output circuit having a predetermined number of output terminals, comprising (a) a ratio logic network which is responsive to signals selectively appearing on the output terminals of the signal output circuit and which is operative to produce an output signal variable in voltage with the number of the output terminals selected by the signal output circuit so that signals of a predetermined logic state are present on the selected output terminals at a given point of time, and (b) detecting means operative to compare the output signal with a predetermined reference signal for producing a test result signal having a first logic state in the presence of a first relationship between the output signal and the reference signal and a second logic state in the presence of a second relationship between the output signal and the reference signal.

The ratio logic network in the signal detecting circuit thus constructed may comprise switching elements each having a control terminal, the respective control terminals being connected to the output terminals, respectively, of the signal output circuit, the switching elements being arranged to produce an operational parameter which is stepwise variable with the number of the output lines selected by the signal output circuit. In this instance, each of the switching elements consists of a field-effect transistor having a gate forming the control terminal, the individual field-effect transistors being connected in parallel to a common node connected to the detecting means and to a source of a supply voltage across an activator switching element, the field-effect transistors providing a combined on-state resistance which is stepwise variable generally in inverse proportion to the number of the field-effect transistors in conduction states. The detecting means may comprise a sense amplifier having one input terminal connected to the common node and another input terminal connected to a predetermined reference signal.

BRIEF DESCRIPTION OF THE DRAWINGS

The features and advantages of a signal detecting circuit according to the present invention will be more clearly appreciated from the following description taken in conjunction with the accompanying drawings in which like reference numerals and characters designate similar or corresponding units and elements and in which.

DESCRIPTION OF THE PREFERRED EMBODIMENT

While a signal detecting circuit according to the present invention will be hereinafter described first as being applied to an address decoder circuit of a semiconductor memory system, it should be borne in mind that the gist of the present invention is applicable to a signal output circuit having a plurality of parallel output terminals and normally operative so that a signal is to appear only at a selected one or each of two or more selected ones of the output terminals at a given point of time. Typical examples of such signal output circuits include shift registers and binary counters and a signal generator which is to produce an output signal only in the presence concurrently of a predetermined number of input signals.

Figure 3:
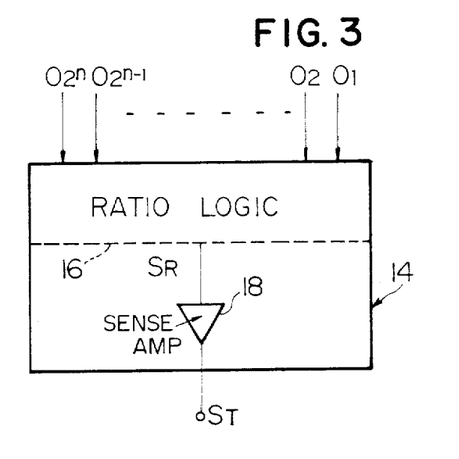
FIG. 3 is a schematic block diagram showing the general arrangement incorporating an address decoder circuit and a signal detecting circuit embodying the present invention.

Referring to FIG. 3 of the drawings, a signal detecting circuit embodying the present invention is shown provided in the form of a decoder testing circuit which is designated in its entirety by reference numeral 14 and which has input terminals connected to an address decoder circuit (not shown) of a semiconductor memory system. The address decoder circuit to be tested by the decoder testing circuit 14 is assumed, by way of example, as having a $2^n$ number of output lines $O_1, O_2, \ldots O_{2n-1}$ and $O_{2n}$ as in the prior-art arrangement described with reference to FIG. 1. As discussed previously, these $2^n$ number of output lines $O_1, O_2, \ldots O_{2n-1}$ and $O_{2n}$ are also connected to the individual memory cells of a memory array (not shown) through the bit lines and word lines of the array, though not shown in the drawings. As will be understood as the description proceeds, the decoder testing circuit 14 largely comprises a ratio logic network 16 and a sense amplifier 18. The ratio logic network 16 is arranged to have an operational or on-state parameter which varies generally in inverse proportion to the number of the output lines selected by the address decoder circuit. The ratio logic network 16 is thus operative to produce an output signal $S_R$ which is stepwise variable with the number of the selected output lines of the decoder circuit. The variable signal $S_R$ thus produced by the ratio logic network 16 is supplied to the sense amplifier 18 which then compares the voltage of the input signal $S_R$ with a predetermined threshold voltage and produces a logic "1" or "0" output signal $S_T$ as a test result signal depending upon the proper or improper operating condition of the address decoder circuit 10.

Figure 4:
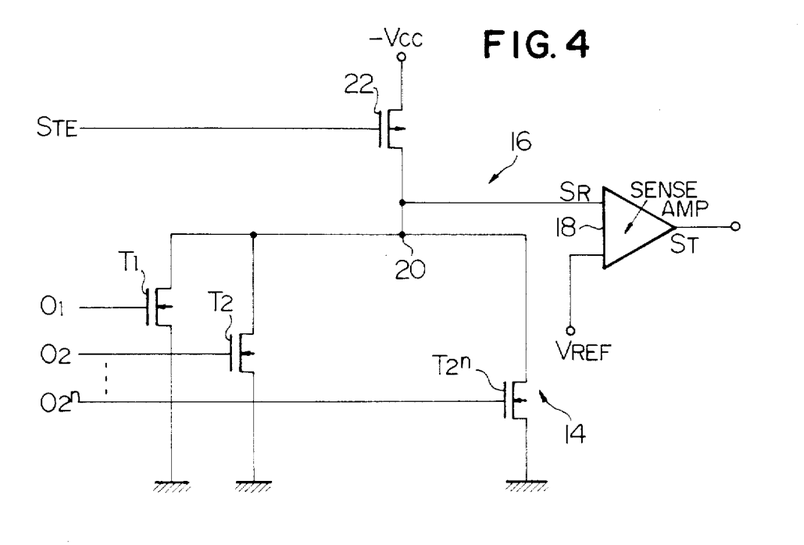
FIG. 4 is a circuit diagram showing the circuit arrangement of a preferred form of signal detecting circuit which may be used in the arrangement illustrated in FIG. 3.

A preferred example of the circuit arrangement which implements the decoder testing circuit 14 to achieve such a function is illustrated in FIG. 4. Referring to FIG. 4, the ratio logic network 16 of the decoder testing circuit 14 embodying the present invention comprises controllable switching elements which consist of a $2^n$ number of n-channel field-effect transistors $T_1, T_2, \ldots$ and $T_{2n}$ having their gates respectively connected to the output lines $O_1, O_2, \ldots$ and $O_{2n}$ leading from the address decoder circuit. The field-effect transistors $T_1, T_2, \ldots$ and $T_{2n}$ further have their sources connected to ground line and their drains connected to a common node 20. The ratio logic network 16 further comprises a p-channel field-effect transistor 22 which has its gate connected to a signal supply line for supplying an active-low test enable signal $S_{TE}$. The field-effect transistor 22 further has its source connected to the common node 20 and its drain connected to a voltage supply line for supplying a negative-polarity supply voltage $-V_{CC}$. The common node 20 thus connected to the respective drains of the n-channel field-effect transistors $T_1, T_2, \ldots$ and $T_{2n}$ and the source of the p-channel field-effect transistor 22 is further connected to an input terminal of the sense amplifier 18 which has been mentioned with reference to FIG. 3.

Throughout the period of time when the decoder circuit is not under testing or inspection, the test enable signal $S_{TE}$ at the gate of the p-channel field-effect transistor 22 is maintained at a high, viz., logic "1" level so that the transistor 22 is held in non-conduction state. Under such a condition, the common node 20 and accordingly the drain of each of the n-channel field-effect transistors $T_1, T_2, \ldots$ and $T_{2n}$ are isolated from the supply line for the supply voltage $-V_{CC}$ so that there is no current flowing through each of the transistors $T_1, T_2, \ldots$ and $T_{2n}$.

In the presence, now, of of test enable signal $S_{TE}$ of a low, viz., logic "0" level at the gate of the p-channel field-effect transistor 22, the transistor 22 is activated to turn on so that each of the n-channel field-effect transistors $T_1, T_2, \ldots$ and $T_{2n}$ is connected to the supply line for the supply voltage $-V_{CC}$. Each of the transistors $T_1, T_2, \ldots$ and $T_{2n}$ thus becomes ready to turn on in response to a high voltage to appear at its gate. Assume now that any one, and only one, of the $2^n$ number of output lines $O_1, O_2, \ldots O_{2n-1}$ and $O_{2n}$ from the address decoder circuit is selected by the decoder circuit and is activated to a logic "1" state. If, in this instance, the first output line $O_1$ in particular is selected and activated to a logic "1" state, a voltage of a high level appears at the gate of the n-channel field-effect transistor $T_1$ associated with the particular line $O_1$ so that the transistor $T_1$ is activated to turn on. At the common node 20 of the ratio logic network 16 is thus built up a voltage which depends on the on-state resistance of the transistor $T_1$ and is supplied as the signal $S_R$ to one input terminal of the sense amplifier 18. The on-state resistances of the individual transistors $T_1$, $T_2$, ... and $T_{2^n}$ will slightly vary from one of the transistors to another but are herein assumed to be equal to $R_{ON}$ on the average for simplicity of discussion.

Assume, on the other hand, that the address decoder circuit is improperly operating at a given point of time so that two or more of the output lines $O_1$, $O_2$, ... $O_{2^n-1}$ and $O_{2^n}$ are concurrently selected and activated each to a logic "1" state during a certain read or write cycle of the memory system. For discussion sake, the output lines $O_1$ and $O_2$ in particular may be assumed to be selected concurrently so that a voltage of a high level appears at the gate of each of the two transistors $T_1$ and $T_2$. The transistors $T_1$ and $T_2$ are thus activated to turn on concurrently so that the combined equivalent on-state resistance, $R_o$, of the parallel combination of the transistors $T_1$ and $T_2$ is given $R_o = R_{ON}/2$, or generally $R_o = R_{ON}/m$ for an m number of output lines selected. This means that the voltage of the signal $S_R$ which appears at the common node 20 of the ratio logic network 16 varies stepwise with the number of the n-channel field-effect transistors $T_1$, $T_2$, ... and $T_{2^n}$ in conduction states and accordingly with the number of the output lines $O_1$, $O_2$, ... $O_{2^n-1}$ and $O_{2^n}$ concurrently selected by the decoder circuit.

Figure 5:
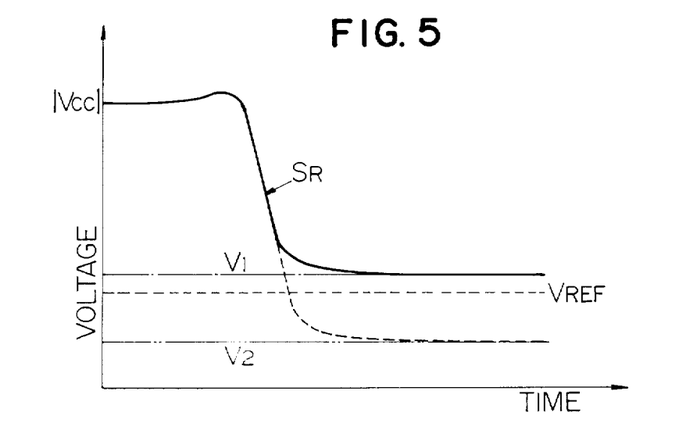
FIG. 5 is a graphic representation of an example of the waveform of a "ratio logic" signal which is to appear in the signal detecting circuit embodying the present invention under different conditions of the detecting circuit.

FIG. 5 shows an example of the waveform of the signal $S_R$ thus appearing at the common node 20 of the ratio logic network 16 under different conditions of the network 16. As will be seen from the curve of FIG. 5, the signal $S_R$ at the common node 20 stays at a level approximating the supply voltage $-V_{CC}$ throughout the period of time when the decoder circuit is not under testing. When the decoder circuit is in a sound state selecting only one of the $2^n$ number of output lines $O_1$, $O_2$, ... $O_{2^n-1}$ and $O_{2^n}$ in the presence of the test enable signal $S_{TE}$ of low level, one of the n-channel field-effect transistors $T_1$, $T_2$, ... and $T_{2^n}$ of the ratio logic network 16 is activated to turn on as above discussed so that the signal $S_R$ appearing at the node 20 assumes a voltage level $V_1$ as indicated in FIG. 5. If, on the other hand, there are two output lines selected concurrently by the decoder circuit so that two of the n-channel field-effect transistors $T_1$, $T_2$, ... and $T_{2^n}$ are activated to turn on, the combined on-state resistance $R_o$ effective in the ratio logic network 16 becomes one half of the value which is produced with only one of the transistors $T_1$, $T_2$, ... and $T_{2^n}$ turned on. The signal $S_R$ appearing at the node 20 now assumes a voltage level $V_2$ lower in magnitude than the reference voltage level $V_{REF}$ as well as the above mentioned voltage level $V_1$. The signal $S_R$ produced by the ratio logic network 16 is thus stepwise variable with the number of the transistors $T_1$, $T_2$, ... and $T_{2^n}$ turned on and accordingly with the number of the selected output lines of the decoder circuit. The signal $S_R$ is supplied to one input terminal of the sense amplifier 18 which has another input terminal connected to a source of a predetermined reference voltage $V_{REF}$ which intervenes between the voltage levels $V_1$ and $V_2$ as shown in FIG. 5. The sense amplifier 18 then compares the voltage $V_1$ or $V_2$ of the input signal $S_R$ with the reference voltage $V_{REF}$ and produces a logic "1" or "0" output signal as the previously mentioned rest result signal $S_T$. In this fashion, a logic "1" test result signal $S_T$ appears at the output terminal of the sense amplifier 18 to indicate that the decoder circuit under testing is in a sound state selecting only one out of the $2^n$ number of output lines $O_1$, $O_2$, ... $O_{2^n-1}$ and $O_{2^n}$. On the other hand, a logic a "0" test result signal $S_T$ appears at the output terminal of the decoder testing circuit 12 to indicate that the address decoder circuit 10 is in an improper state selecting two or more of the output lines $O_1$, $O_2$, ... $O_{2^n-1}$ and $O_{2^n}$ concurrently. Whether the decoder circuit under testing is operating properly or not is thus known from the logic state of the signal $S_T$ to be output from the decoder testing circuit 14 during each read or write cycle of the system under testing or inspection.

Assume now that the address decoder circuit under testing has a $2^n$ number of outputs as in the case of the prior-art arrangement described with reference to FIGS. 1 and 2. In this instance, the decoder testing circuit 14 which is operable as above discussed may be composed of a $2^n$ number of n-channel field-effect transistors $T_1$, $T_2$, ... $T_{2^n}$ and one p-channel field-effect transistor 22 for the ratio logic network 16 plus typically about ten field-effect transistors for the sense amplifier 18. A total of as small as about $(2^n + 10)$ number of transistors are thus required for the decoder testing circuit 14 as a whole, offering a decrease of the semiconductor devices by a factor of approximately $\frac{1}{2}^{n-1}$ as compared with the prior-art decoder testing circuit 12 shown in FIG. 2.

The embodiment of a decoder testing circuit which has thus far been described with reference to FIGS. 4 and 5 may be modified in numerous manners if desired. In the decoder testing circuit 14 shown in FIG. 4, the detecting means for comparing the stepwise variable signal $S_R$ with the reference signal $V_{REF}$ to produce the test result signal is implemented by the sense, amplifier 18. In one of the modifications of such an embodiment, the detecting means may be implemented by a logic inverter having a threshold voltage selected to correspond to the reference signal $V_{REF}$ used in the decoder testing circuit 14 shown in FIG. 4.

While it has been described that a signal detecting circuit according to the present invention is embodied in the form of an address decoder circuit which forms part of a semiconductor memory system, the gist of the present invention is applicable to operand decoders used in microprocessors in general and even to various other types of signal output circuits insofar as the signal output circuit has a plurality of parallel outputs and is normally operative so that a signal is to appear only at a selected one or each of two or more selected ones of the output terminals at a given point of time. Examples of such signal output circuits include shift registers and binary counters. The signal detecting circuit for use with such a signal output circuit may be used for the purpose of testing the signal output circuit as in the case of the embodiment hereinbefore described or may be used for the detection of errors in the signal or signals output from the signal output circuit during each cycle of operation of the circuit. Another form of signal output circuit to which the present invention is applicable is a signal generator which is to produce an output signal only in the presence concurrently of a predetermined number of input signals.

Figure 6:
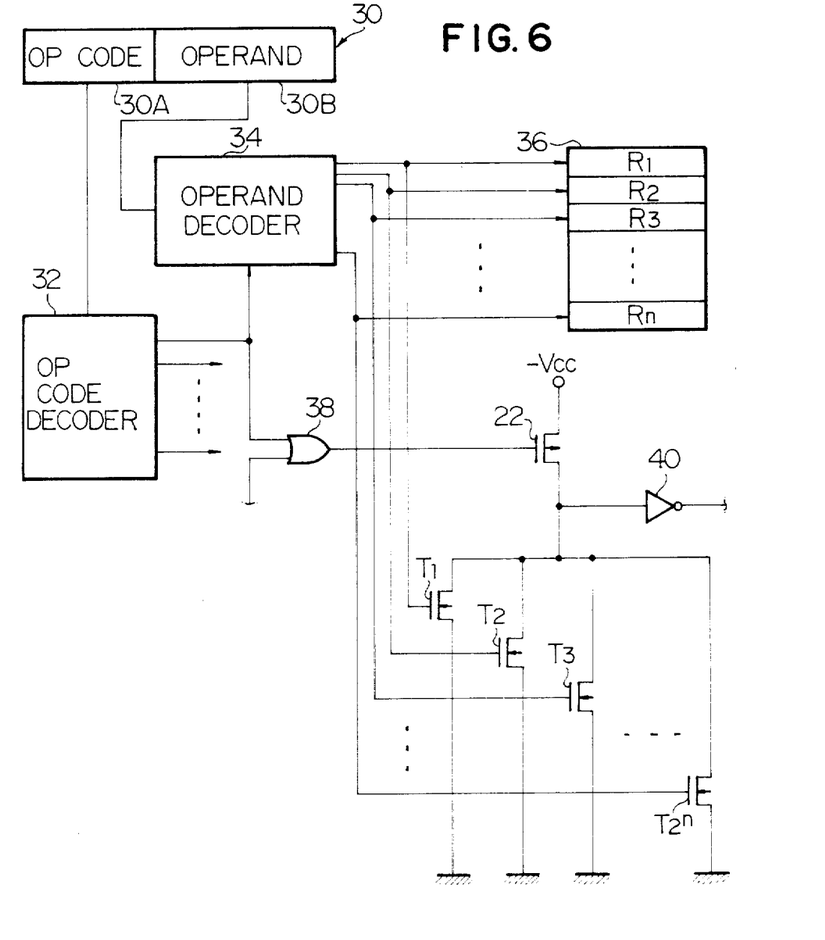
FIG. 6 is a schematic block diagram showing the general arrangement incorporating an instruction register circuit and a signal detecting circuit embodying the present invention.

FIG. 6 of the drawings shows an example of the arrangement in which a signal detecting circuit embodying the present invention is provided in combination with an instruction register circuit 30 included in a microprocessor. The instruction register circuit 30 herein shown is assumed, by way of example, as being operable for providing instruction signals each in the form of a word consisting of an operation code section 30a and an operand section 30b. The operation code sections 30a of the instruction signals are supplied to an operation code decoder circuit 32 while the operand sections 30b of the instruction signals are supplied to an operand address decoder circuit 34 as shown. When the instruction fetched from the program memory of the microprocessor is identified by the operation code decoder circuit 32 as a register file select instruction signal, the operation code decoder circuit 32 transmits an operand decode enable signal to the operand decoder circuit 34 and activates the latter to decode the coded operand indicative of the register selected by the instruction signal. In accordance with the signals thus output in succession from the operand decoder circuit 34, registers are selected one after another out of the registers stacked within a register file 36. The operand decode enable signal to be supplied from the operation code decoder circuit 32 to the operand decoder circuit 34 is assumed to be an active-high logic signal by way of example.

The signal detecting circuit embodying the present invention is used particularly for the purpose of testing the operand decoder circuit 34 associated with the instruction register 30 thus arranged. The operand decoder circuit 34 for use with such an instruction register 30 is assumed to have a $2^n$ number of output lines which are not only associated with the register file 36 but also connected to the signal detecting circuit. This signal detecting circuit is implemented by a decoder testing circuit which comprises a ratio logic network which is constructed similarly to its counterpart in the embodiment described with reference to FIGS. 3 and 4 and which is represented in its entirety also by reference numeral 16. Thus, the ratio logic network 16 of the decoder testing circuit in the arrangement herein shown has the gates of its individual n-channel field-effect transistors $T_1, T_2, \ldots$ and $T_{2n}$ respectively connected to the output lines from the operand decoder circuit 34. The field-effect transistors $T_1, T_2, \ldots$ and $T_{2n}$ have their sources connected to ground line and their drains connected to a common node 20. The p-channel field-effect transistor 22 also forming part of the ratio logic network 16 herein shown has its gate connected to a signal supply line leading from the output terminal of a two-input logic OR gate 38. This logic OR gate 38 has one of its input terminals responsive to the operand decode enable signal to be supplied from the operation code decoder circuit 32 to the operand decoder circuit 34, the other input terminal of the OR gate 38 being connected to a signal supply line for supplying a test enable signal $S_{TE}$. The test enable signal $S_{TE}$ for use in the embodiment herein shown is assumed to be an active-high logic signal. The field-effect transistor 22 further has its source connected to the common node 20 and its drain connected to a voltage supply line for supplying a negative-polarity supply voltage $-V_{CC}$. The common node 20 thus connected to the respective drains of the n-channel field-effect transistors $T_1, T_2, \ldots$ and $T_{2n}$ and the source of the p-channel field-effect transistor 22 is further connected to an input terminal of an inverter 40 which has a threshold voltage corresponding to the reference voltage $V_{REF}$ mentioned in connection with the embodiment described with reference to FIGS. 3 and 4 and shown in FIG. 5.

Throughout the period of time when the operand decoder circuit 34 is not under testing or inspection, the test enable signal $S_{TE}$ at one input terminal of the OR gate 38 is maintained at a high, viz., logic "1" level. In the presence of a low-level operand decode enable signal from the operation code decoder circuit 32, there is a logic "0" signal established at the gate of the p-channel field-effect transistor 22, which is accordingly held in non-conduction state. Under such a condition, the common node 20 and accordingly the drain of each of the n-channel field-effect transistors $T_1, T_2, \ldots$ and $T_{2n}$ are isolated from the supply line for the supply voltage $-V_{CC}$ so that there is no current flowing through each of the transistors $T_1, T_2, \ldots$ and $T_{2n}$.

In the presence, now, of a test enable signal $S_{TE}$ of a high, viz., logic "1" level at one input terminal of the logic OR gate 38 and/or an operand decode enable signal at the other input terminal of the OR gate 38, there is a logic "1" signal at the gate of the p-channel field-effect transistor 22, which is accordingly activated to turn on so that each of the n-channel field-effect transistors $T_1, T_2, \ldots$ and $T_{2n}$ is connected to the supply line for the supply voltage $-V_{CC}$. Each of the transistors $T_1, T_2, \ldots$ and $T_{2n}$ thus becomes ready to turn on in response to a high voltage to appear at its gate. Assume, in this instance, that one, and only one, of the output lines from the operand decoder circuit 34 such as, for example, the first output line in particular is selected by the instruction signal fetched by the instruction register 30 and is activated to a logic "1" state. A voltage of a high level appears at the gate of the n-channel field-effect transistor $T_1$ associated with the particular line so that the transistor $T_1$ is activated to turn on. A voltage of a certain level $V_1$ (FIG. 5) which depends on the on-state resistance of the transistor $T_1$ is thus built up at the common node 20 of the ratio logic network 16 and is supplied as the signal $S_R$ to the inverter 40. If, on the other hand, there are two output lines selected concurrently so that two of the n-channel field-effect transistors $T_1, T_2, \ldots$ and $T_{2n}$ are activated to turn on, the signal $S_R$ appearing at the node 20 assumes a voltage level $V_2$ lower in magnitude than the level of the threshold voltage of the inverter 40. The inverter 40 thus produces a logic "0" output signal in response to the input voltage $V_1$ higher than the threshold voltage thereof or a logic "0" output signal in response to the input voltage $V_2$ lower than the threshold voltage. The logic "0" or "1" signal thus produced by the inverter 40 is output from the inverter 40 as the rest result signal $S_T$ as in the decoder testing circuit described with reference to FIGS. 3 and 4.

What is claimed is:

1. A signal detecting circuit for detecting signals from a signal output circuit having a predetermined number of output terminals of which one, and only one, output terminal is to be normally selected during each recurrent cycle of operation, comprising the combination of
   (a) a first circuit unit which has input terminals respectively connected to the output terminals of said signal output circuit and which has a first operative condition established with only one of said input terminals activated and a second operative condition established with at least two of said input terminals activated, the first circuit unit being operative to produce an output signal which has one voltage level under said first operative condition and another voltage level under said second operative condition, and (b) a second circuit unit which is connected to said first circuit unit and which is operative to discriminate one of said first and second operative conditions from the other on the basis of the output signal from said first circuit unit, wherein said first circuit unit comprises a parallel combination of a plurality of transistors each having a control electrode connected to each of said input terminals, respectively, of the first circuit unit and a control transistor connected between a voltage supply line and said parallel combination of the plurality of transistors.

2. A signal detecting circuit as set forth in claim 1, further comprising logic circuit means connected to the control electrode of said control transistor, the logic circuit means being responsive to a test enable signal which enables said signal detecting circuit to test said signal output circuit and a circuit activating signal enabling said first circuit unit to be responsive to signals to appear on the output terminals of the first circuit unit for activating the control transistor in the presence of at least one of said test enable signal and said circuit activating signal.

3. A signal detecting circuit for detecting signals from a signal output circuit having a predetermined number of output terminals, comprising (a) a ratio logic network which is responsive to signals selectively appearing on said output terminals of the signal output circuit and which is operative to produce an output signal variable in voltage with the number of the output terminals selected by said signal output circuit so that signals of a predetermined logic state are present on the selected output terminals at a given point of time, and (b) detecting means operative to compare said output signal with a signal with a predetermined magnitude for producing a test result signal having a first logic state in the presence of a first relationship between said output signal and said signal with the predetermined magnitude and a second logic state in the presence of a second relationship between said output signal and said signal with the predetermined magnitude.

4. A signal detecting circuit as set forth in claim 3, in which said ratio logic network comprises switching elements each having a control terminal connected to each of said output terminals, respectively, of said signal output circuit, said switching elements being arranged to produce an operational parameter which is stepwise variable with the number of the output lines selected by the signal output circuit.

5. A signal detecting circuit as set forth in claim 4, in which each of said switching elements consists of a field-effect transistor having a gate forming said control terminal, the individual field-effect transistors being connected in parallel to a common node connected to said detecting means and to a source of a supply voltage across an activator switching element, said field-effect transistors providing a combined on-state resistance which is stepwise variable generally in inverse proportion to the number of the field-effect transistors in conduction states.

6. A signal detecting circuit as set forth in claim 5, in which said activator switching element has a control terminal connected to a source of an actuation control signal.

7. A signal detecting circuit as set forth in claim 6, in which said activator switching element consists of a field-effect transistor having a gate forming said control terminal of the activator switching element.

8. A signal detecting circuit as set forth in claim 5, in which said detecting means comprises a sense amplifier having one input terminal connected to said common node and another input terminal connected to a supply source of a predetermined reference signal.

9. A signal detecting circuit as set forth in claim 5, in which said detecting means comprises an inverter having a predetermined threshold voltage and having an input terminal connected to said common node.

10. A signal detecting circuit for detecting signals from an operand decoder circuit having a predetermined number of output terminals, the operand decoder circuit being coupled with an instruction register circuit and an operation code decoder circuit and being activated by an operand decode enable signal supplied from the operation code decoder circuit, the signal detecting circuit comprising the combination of (a) a first circuit unit which has input terminals respectively connected to the output terminals of said operand decoder circuit and which has a first operative condition established with only one of said input terminals activated and a second operative condition established with at least two of said input terminals activated, the first circuit unit being operative to produce an output signal which has one voltage level under said first operative condition and another voltage level under said second operative condition, and (b) a second circuit unit which is connected to said first circuit unit and which is operative to discriminate one of said first and second operative conditions from the other on the basis of the output signal from said first circuit unit, wherein said first circuit unit comprises a parallel combination of plurality of transistors each having a control electrode connected to each of said input terminals, respectively, of the first circuit unit and a control transistor connected between a voltage supply line and said parallel combination of the plurality of transistors.

11. A signal detecting circuit as set forth in claim 10, further comprising a logic OR gate circuit connected to the control electrode of said control transistor, the logic OR gate circuit being responsive to a test enable signal which enables said signal detecting circuit to test said operand decoder circuit and a circuit activating signal enabling said first circuit unit to be responsive to signals to appear on the output terminals of the first circuit unit for activating the control transistor in the presence of at least one of said test enable signal and said circuit activating signal.

12. A signal detecting circuit as set forth in claim 11, in which said second circuit unit comprises an inverter having a predetermined threshold voltage and having an input terminal connected to a common node between a voltage supply line and said parallel combination of the plurality of transistors.

13. A signal detecting circuit for detecting signals from a signal output circuit having a predetermined number of output terminals, comprising (a) a ratio logic network which comprises
switching transistors each having a control terminal connected to each of said output terminals, respectively, of said signal output circuit, said switching transistors being connected in parallel to a common node, and an activator transistor having a current path through which said common node is connected to a source of a supply voltage, said activator transistor having a control terminal connected to a source of an actuation control signal, said switching transistors providing a combined on-state resistance which is stepwise variable generally in inverse proportion to the number of the transistors in conduction states so that said ratio logic network is operative to produce an output signal variable in voltage with the number of the output terminals selected by said signal output circuit whereby signals of a predetermined logic state are present on the selected output terminals at a given point of time, and (b) detecting means comprising a sense amplifier having one input terminal connected to a supply source of a predetermined reference signal so that said detecting means is operative to compare said output signal with a signal with a predetermined magnitude for producing a test result signal having a first logic state in the presence of a first relationship between said output signal and said signal with the predetermined magnitude and a second logic state in the presence of a second relationship between said output signal and said signal with the predetermined magnitude.

14. A signal detecting circuit for detecting signals from a signal output circuit having a predetermined number of output terminals, comprising (a) a ratio logic network which comprises switching transistors each having a control terminal connected to each of said output terminals, respectively, of said signal output circuit, said switching transistors being connected in parallel to a common node, and an activator transistor having a current path through which said common node is connected to a source of a supply voltage, said activator transistor having a control terminal connected to a source of an actuation control signal, said switching transistors providing a combined on-state resistance which is stepwise variable generally in inverse proportion to the number of the transistors in conduction states so that said ratio logic network is operative to produce an output signal variable in voltage with the number of the output terminals selected by said signal output circuit whereby signals of a predetermined logic state are present on the selected output terminals at a given point of time, and (b) detecting means comprising an inverter having a predetermined threshold voltage and having an input terminal connected to said common node so that said detecting means is operative to compare said output signal with a signal with a predetermined magnitude for producing a test result signal having a first logic state in the presence of a first relationship between said output signal and said signal with the predetermined magnitude and a second logic state in the presence of a second relationship between said output signal and said signal with the predetermined magnitude.

* * * * *

UNITED STATES PATENT AND TRADEMARK OFFICE
CERTIFICATE OF CORRECTION

PATENT NO. : 4,817,033

DATED : March 28, 1989

INVENTOR(S) : KEI KOYA

It is certified that error appears in the above-identified patent and that said Letters Patent is hereby corrected as shown below:

Col. 1, line 46, delete "n" and insert --$\underline{n}$--.

line 53, delete "n" and insert --$\underline{n}$--.

Col. 4, line 38, delete "circuit", second occurrence.

Col. 7, line 24, delete "m" and insert --$\underline{m}$--.

Signed and Sealed this

Twenty-fourth Day of October, 1989

Attest:

DONALD J. QUIGG

*Attesting Officer*  *Commissioner of Patents and Trademarks*